Jan. 19, 1960 M. G. CROSBY 2,922,116
VOLUME-LIMITING AMPLIFIER
Filed Sept. 19, 1955
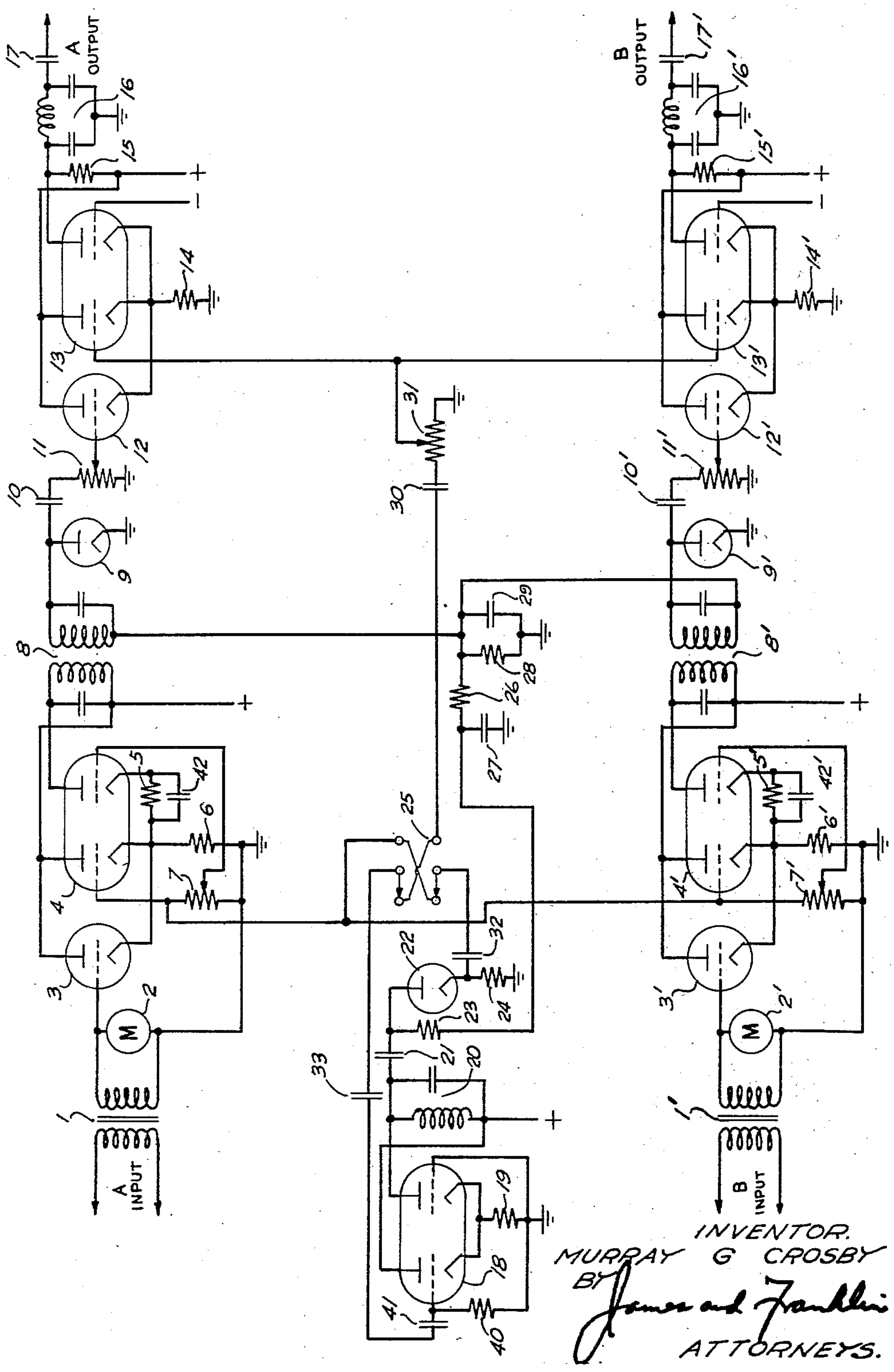
INVENTOR.
MURRAY G CROSBY
BY James and Franklin
ATTORNEYS.

United States Patent Office 2,922,116
Patented Jan. 19, 1960

2,922,116

VOLUME-LIMITING AMPLIFIER

Murray G. Crosby, Syosset, N.Y.

Application September 19, 1955, Serial No. 535,091
20 Claims. (Cl. 330—124)

This invention relates to volume-limiting amplifiers, and more particularly to such amplifiers intended for use in multinaural, most commonly binaural, transmission. Volume-limiting amplifiers are normally used in broadcast stations to prevent over modulation of the broadcast transmitter when sudden surges of program volume occur. These volume-limiting amplifiers usually supplement the function of the monitoring operator who controls the gain of program amplifiers to compensate for changes in microphone output level. The usual volume-limiting circuit rectifies the program voltage, and uses this rectified voltage to control the gain of the amplifier. In this way, the maximum volume of the program level may be limited at a fixed point, which may correspond to 100% modulation at the transmitter.

In binaural program transmission two or more microphones are used, so that there are two or more channels to be controlled. If volume limiters of the type which have been available in the prior art are used on a binaural-program system, the only way to connect them in a circuit is to place a volume limiter in each microphone channel. Such an arrangement destroys the true binaural rendition of the system, since it tends to hold the volume of both microphones at an equal value, and does not allow them to relatively vary in amplitude as they do in binaural transmission. For instance, if an orchestral instrument happens to be nearer microphone A than it is to microphone B, the volume transmitted by the channel of microphone A will necessarily be higher than that transmitted by channel B. If this volume ratio is impaired, as would be the case if separate volume limiters were placed in each channel, the true sound perspective which is obtained in binaural transmission would be lost.

To apply volume limiting to binaural transmission, a new arrangement must be provided, and the primary object of the present invention is to provide such an arrangement. A further object of the invention is to provide a volume-limiting system which will control the volume of both microphone channels in the optimum manner to preserve the true binaural rendition. I have found that the optimum control is a control of the volume of both channels simultaneously, at a level determined by the volume in the channel having the highest amplitude. This type of control will not destroy the sound perspective, but will control the effective volume of the whole system in the proper manner. In the system of this invention, such a control is obtained by obtaining the control potential from a rectifier circuit which responds substantially to the strongest channel, and feeding the control potential simultaneously to the controlled amplifiers in the individual channels.

Another object and feature is the method of obtaining the control potential. This is obtained from the rectified energy of a carrier eliminated modulator producing only the sidebands of a wave modulated by the program. That in turn provides design simplicities in the rectifier circuit, since the wave to be rectified is high in frequency compared with the derived control potential.

It is another object of this invention to provide a type of volume-limiting amplifier which is free from "thumps" which are present in most of the prior art volume-limiting systems. Accordingly, another object and feature of my invention is the type of volume-limiting used. The control potential is used to control the amplitude of the carrier which is being amplitude modulated by the signal. The conventional control is from the rectified audio signal to the control grid of an audio amplifier. The conventional systems have had to resort to balanced circuits to eliminate "thumps" which are caused when the rectified audio signal is applied directly to the audio amplifier control grids. In the system of the present invention, these "thumps" are eliminated because they cannot get through the small blocking condensers which are used in the carrier oscillator control circuit.

To accomplish the foregoing general objects, and other more specific objects which will hereinafter appear, my invention resides in the volume-limiting amplifier circuit, and the elements thereof, and their relation one to another, as are hereinafter more particularly described in the following specification. The specification is accompanied by a wiring diagram showing a typical volume-limiting amplifier circuit for binaural transmission.

Referring to the drawing, I there show an embodiment of the invention having two channels A and B, as in a binaural transmission system. It should be understood that the A and B outputs, as well as the A and B inputs, are simply program information, typically music, which is in the audio frequency stage. Although a carrier is used in the circuits shown it is used only temporarily, it being first introduced by modulation but thereafter followed by detection, thereby restoring the program information to audio frequency. As is later described, this temporary introduction of a carrier is for improved volume control. The binaural transmitter is located outside the drawing, beyond the "Output" leads shown at the right, while the spaced microphones are outside the drawing, ahead of the "Input" leads shown at the left. Of course, the microphones may be followed by pre-amplifiers, also located ahead of the A and B inputs.

The binaural transmission system beyond the "Output" leads may be conventional, and in one typical case the A output may be supplied to an amplitude modulation transmitter, while the B output is supplied to a frequency modulation transmitter, for simultaneous broadcast. Another transmission system may employ multiplexing on one frequency-modulation channel, by use of a subcarrier, as described in detail and claimed in my copending application Serial No. 350,164, filed April 21, 1953 now Patent No. 2,851,532 and entitled "Multiplex Communication System." Still another system may employ frequency modulation oscillators followed by frequency multipliers followed by a single common power amplifier for the outputs of the multipliers, this system being described and claimed in my copending application Serial No. 387,292, filed October 20, 1953 and entitled "Frequency Modulation Communication System."

The microphones, pre-amplifiers, transmitter circuits, and antennas have not been shown in the drawing, it being thought unnecessary to show those parts of the complete system which are or may be entirely conventional.

Referring again to the drawing, in each of the channels A and B the program input produces carrier-eliminated amplitude-modulation of a locally generated carrier, preferably having an intermediate frequency. The resulting sidebands are rectified for purposes of controlling the program volume. The rectifiers are included in a common diode resistor connection (somewhat analogous to that used in space diversity reception) so arranged that the stronger program assumes control, and then controls both amplifier channels in accordance with the volume of the said stronger program.

Considering the arrangement more specifically, the microphone A (not shown) feeds A input through transformer 1, and its volume is indicated on a meter 2. Tubes 3 and 4 comprise a "triple-triode" carrier eliminated amplitude modulator of the type described in greater detail and claimed in my copending application, Serial No. 446,019, now Patent No. 2,866,163. Resistors 5 and 6 provide self-bias, and tapped resistor 7 serves as a grid return for the two grids of dual tube 4, together with a voltage divider to divide the carrier voltage fed to these two grids in the proper ratio to produce carrier-eliminated amplitude modulation. Transformer 8 selects the sidebands produced by the carrier-eliminated modulator. These sidebands are rectified by diode 9, having resistor 28 in its cathode circuit.

The "B input" is fed through transformer 1' through to diode 9' in exactly the same manner as "A input" is fed from transformer 1 to diode 9. Corresponding elements for the B channel are numbered with the same numerals but with a prime added. Diode 9' from channel B is connected to the same resistor 28 which was previously described as connected to diode 9. Resistor 28 is bypassed by condenser 29. The operation is such that the sidebands from the strongest channel provide the rectified voltage across resistor 28.

A resistor 26 and a condenser 27 provide a time-constant network to prevent audio frequency potentials from passing through to a diode gate 22, which controls the carrier from a carrier oscillator 18. Carrier oscillator 18, which is of the twin-triode type described in greater detail and claimed in my U.S. Patent No. 2,269,417, uses a common cathode resistor 19 and a tuned circuit 20. This oscillator, which may be tuned at a frequency of the order of 100 to 200 kc., feeds oscillator voltage through a blocking condenser 21, to the diode gate 22. This voltage is controlled by the common diode potential from the resistor 28 to the low side of resistor 23 in the diode gate circuit.

The carrier oscillator voltage across resistor 24 in the output of the diode gate has an amplitude which has an inverse proportion to the voltage across the resistor 28. This controlled carrier voltage is fed from blocking condenser 32 to a reversing switch 25. Uncontrolled-carrier voltage is also fed from another blocking condenser 33 to the other arm of reversing switch 25. With the reversing switch thrown as shown, volume controlled oscillator voltage will be fed to the carrier grid of triple-triode modulator 3, 4, and the uncontrolled carrier voltage will be fed through a blocking condenser 30 and a potentiometer 31 to the carrier grids of triple-triode detectors 12, 13 and 12', 13'. Triple-triode detectors 12, 13 detect the sidebands from the carrier-eliminated modulator applied through the blocking condenser 10 and the potentiometer 11, in connection with the carrier from the blocking condenser 30 and the potentiometer 31 in an exalted-carrier detection on the triple-triode detectors. The detected outputs of channel A and channel B appear on resistors 15 and 15'. Carrier voltage is eliminated by lowpass filter 16 and 16', and the A and B channel outputs are made available at blocking condenser 17 and 17'.

The triple-triode detector is also called a "product detector", and operates similarly to the multi-grid detector described in my article, "Exalted-Carrier Amplitude-and-Phase Modulation Reception," published in the September, 1945 issue of "Proceedings of Institute of Radio Engineers."

In its operation, the system takes advantage of the novel feature of the triple-triode modulators 3, 4 and 3', 4' in which variation of the carrier amplitude is what varies the level of the modulated output. Such a control is an advantageous type to use since it does not control the bias on a grid which is also used for amplification, such as is the case in the prior art type of volume-limiting amplifiers. Carrier-eliminated modulation is chosen to provide easy rectification of the program level at an intermediate frequency, as distinguished from audio frequency. Also, it allows low distortion detection by the exalted-carrier triple-triode detectors.

As an example, let it be assumed that the A channel input is higher than the B channel input. This will cause a larger voltage to appear from transformer 8 than from transformer 8', so that diode 9' will not draw current since it will be biased to cut off, but diode 9 will draw current in accordance with the amplitude of the signal on channel A. This controlling voltage is then fed to the diode gate 22 in order to vary the level of the carrier fed to the carrier-eliminated modulators 3, 4 and 3', 4' so as to control their overall gain simultaneously.

If the A input becomes less than the B input, diode 9 will be biased to cut off, and channel B will govern the amplification of both channels. In this way, a gain control is obtained without upsetting the ratio between the amplitudes on the two channels. In other words, the optimum condition which this invention provides is to maintain constant the ratio between the voltage fed to "A input" and that fed to "B input."

By throwing the reversing switch 25 to the side opposite to that shown, the uncontrolled carrier voltage is fed to the carrier-eliminated modulators 3, 4 and 3', 4', and the controlled carrier voltage is fed to the carrier grids of the triple-triode detectors 12, 13 and 12', 13'. The output of the triple-triode type of detector is also proportional to the level of the carrier input, so that control of the detected output may be obtained in this manner. This type of control, however, is a "forward acting" type which does not have the inverse feedback features of the arrangement with the switch 25 turned to the left as shown. However, different laws of control may be obtained by the two types of control, namely, inverse feedback and forward-acting, so that it is advantageous to have a choice of this kind.

In the specific circuit shown in the drawing the following component values may be used. The vacuum tubes 4, 13 and 18 are type 12AU7, and the same applies to the tubes 4' and 13' for the other channel. The vacuum tubes 3, 3', 12 and 12' are type 6C4. The vacuum tubes 9 and 9', and also the tube 22, are type 6AL5.

Resistors 6, 6', 14, 14' and 19 are each 1,000 ohms. The resistors 5 and 5' each have a value of 2700 ohms. The resistors 7, 7', 11, 11', 31 and 31' are potentiometers each having a resistance of 500,000 ohms. The resistors 24, 26 and 40 have a value of 470,000 ohms each. The resistors 23 and 28 each have a value of 100,000 ohms. The resistors 15 and 15' each have a value of 33,000 ohms.

The condensers 10, 10', 21, 29, 30, 33 and 41 each have a value of 100 mmf. The condensers 17 and 17' have a value of 0.05 mf. each. The condensers 42 and 42' have a value of 0.005 mf. each. The condenser 27 is approximately 0.1 mf., but it is adjusted for smooth limit control.

The transformers 8 and 8' are tuned to the carrier oscillator frequency (which in this case is approximately 20 kc.), with a bandwidth to pass a double sideband carrier modulated by the A input or the B input. The tuned circuit 20 is tuned to the carrier oscillator frequency, which in this case is approximately 20 kc. The lowpass filters 16 and 16' are designed to pass the program and to reject the carrier frequency.

It will be apparent to those skilled in the art that this type of volume-limiting system is not limited to a two-channel binaural or stereophonic system but may be extended to as many channels as there are microphones used. For instance, if a third channel is added, all of the elements labeled with primes would be duplicated again in a third channel C. The diode of the third channel would be likewise connected across the common resistor 28, and the controlled and uncontrolled voltages would be supplied from the same carrier oscillator 18 here shown.

From a method viewpoint, the method is to volume limit the multiple channels of a multinaural system while preserving relative differences of volume between the channels, this being done by using the maximum volume channel to simultaneously control the volume of all of the channels. The apparatus comprises volume limiting means for all channels, and a common control circuit for controlling said volume limiting means, and means connecting all of said channels to the said common control circuit. The volume limiting means is preferably made to act on a carrier, before applying the program modulation to the carrier. More specifically, each channel has a carrier eliminated modulator, and a diode for volume control. There is a carrier oscillator for use with all of the channels, and means including a volume control impedance connected in common in the circuits of all of the volume control diodes, to control the carrier volume. The volume-controlled carrier is supplied to the carrier eliminated modulators. The channels further may include a detector for exalted carrier detection, and in such case a non-volume-controlled portion of the carrier is supplied to the exalted carrier detectors. However, for special purposes the connections may be reversed to feed the volume-controlled portion of the carrier to the detectors, and the non-volume-controlled portion of the carrier to the modulators, instead of vice versa.

It is believed that the circuit of my invention, as well as the method using the same, and the advantages thereof, will be apparent from the foregoing detailed description. Volume limiting is effectively applied, while fully preserving the true binaural or multinaural rendition. The control potential is obtained from the rectified energy of a carrier eliminated modulator producing only the sidebands of the program modulated carrier. This control potential is used to control the amplitude of the carrier which is being amplitude modulated by the signal, thereby avoiding thumps caused in prior systems.

It will be understood that the specific values of circuit components listed above have been given solely by way of example, and not intended to be in limitation of the invention.

It will also be apparent that while I have shown and described my invention in a preferred form, changes may be made, without departing from the scope of the invention, as sought to be defined in the following claims.

I claim:

1. A multiple channel amplitude modulation circuit for a transmitter comprising a source of carrier energy, means in each of the channels to modulate the same, volume limiting means associated with the source of carrier energy for controlling the volume of the carrier energy which is to be used for all channels, a common control circuit for controlling said volume limiting means, means connecting all of said channels to said common control circuit, whereby the volume of all channels is controlled by the channel of maximum volume, and whereby said volume limiting means controls the amplitude of the carrier prior to applying the program modulation to said carrier.

2. A multinaural transmission circuit for a plurality of signals, said circuit comprising a plurality of channels each having a modulator for one of said signals, a carrier generating oscillator for use with all of the channels, means to control the carrier volume, said means including a volume control circuit connected in common in the output circuits of all of the modulators in such fashion that the maximum volume channel takes control, and means for supplying the volume-controlled carrier in common to all of the modulators.

3. A multinaural transmission circuit comprising a plurality of channels each having an amplitude modulator, a carrier generating oscillator for use with all of the channels, means to control the carrier volume, said means including a volume control circuit connected in common in the output circuits of all of the modulators in such fashion that the maximum volume channel takes control, means for supplying the volume-controlled carrier in common to all of the modulators, and a demodulator for each of the channels to restore the original channel signals as volume-controlled.

4. A multinaural transmission circuit comprising a plurality of channels each having a carrier eliminated modulator, and a diode for volume control, a carrier oscillator for use with all of the channels, means to control the carrier volume, said means including a volume control impedance connected in common in the circuits of all of the aforesaid volume control diodes, and means for supplying the volume-controlled carrier in common to the carrier eliminated modulators of all of the channels.

5. A multinaural transmission circuit comprising a plurality of channels each having a carrier eliminated modulator, a rectifier for volume control, and a detector for exalted carrier detection, a carrier oscillator for use with all of the channels, means to control the volume of a portion of the carrier, including a volume control impedance connected in common in the circuits of all of the aforesaid volume control rectifiers, means for feeding the volume-controlled carrier output in common to the carrier eliminated modulators of all of the channels, and means for feeding a non-volume-controlled portion of the output of the carrier oscillator to the exalted carrier detectors of all of the channels.

6. A multinaural transmission circuit comprising a plurality of channels each having a triple triode carrier eliminated modulator, a diode for volume control, a triple triode detector for exalted carrier detection, and a filter to eliminate carrier voltage, an intermediate frequency carrier oscillator of the twin triode type for use with all of the channels, a diode gate to control the volume of a portion of the carrier, a volume control resistor connected in common in the circuits of all of the aforesaid volume control diodes, means including a time constant RC circuit connecting said volume control resistor to the diode gate, means for feeding the volume-controlled carrier output following the diode gate in common to the carrier eliminated modulators of all of the channels, and means for feeding a non-volume-controlled portion of the output of the carrier oscillator to the exalted carrier detectors of all of the channels.

7. A multinaural transmission circuit comprising a plurality of channels each having a diode for volume control, and a detector for exalted carrier detection, a carrier oscillator for use with all of the channels, means to control the carrier volume, said means including a volume control impedance connected in common in the circuits of all of the aforesaid volume control diodes, and means for supplying the volume-controlled carrier output in common to the exalted carrier detectors of all of the channels.

8. A multinaural transmission circuit comprising a plurality of channels each having a carrier eliminated modulator, a rectifier for volume control, and a detector for exalted carrier detection, a carrier oscillator for use with all of the channels, means to control the volume of a portion of the carrier, including a volume control impedance connected in common in the circuits of all of the aforesaid volume control rectifiers, means for feeding the volume-controlled carrier output in common to the exalted carrier detectors of all of the channels, and means for feeding a non-volume-controlled portion of the output of the carrier oscillator to the carrier eliminated modulators of all of the channels.

9. A multinaural transmission circuit comprising a plurality of channels each having a triple triode carrier eliminated modulator, a diode for volume control, a triple triode detector for exalted carrier detection, and a filter to eliminate carrier voltage, an intermediate frequency carrier oscillator of the twin triode type for use with all of the channels, a diode gate to control the volume of a portion of the carrier, a volume control resistor connected in common in the circuits of all of the aforesaid volume control diodes, means including a time constant RC circuit connecting said volume control resistor to the diode gate, means connecting the volume controlled carrier output following the diode gate in common to the exalted carrier detectors of all of the channels, and means for feeding a non-volume-controlled portion of the output of the carrier oscillator to the carrier eliminated modulators of all of the channels.

10. A multinaural transmission circuit comprising a plurality of channels each having a carrier eliminated modulator, a diode for volume control, and a detector for exalted carrier detection, a carrier oscillator for use with all of the channels, means to control the volume of a portion of the carrier, including a volume control impedance connected in common in the circuits of all of the aforesaid volume control diodes, a reversing switch, means connecting a volume-controlled portion of the carrier to one part of said reversing switch, means connecting a non-volume-controlled portion of the carrier to another part of said switch, means connecting the modulators of all of the channels in common to a part of said switch, and means connecting the detectors of all of the channels in common to another part of said switch, the switch arrangement being such that in one switch position the volume-controlled carrier is supplied to the modulators and the non-volume-controlled carrier is supplied to the detectors, and in another switch position the volume-controlled carrier is supplied to the detectors and the non-volume-controlled carrier is supplied to the modulators.

11. A multinaural transmission circuit comprising a plurality of channels each having a triple triode carrier eliminated modulator, a diode for volume control, a triple triode detector for exalted carrier detection, and a filter to eliminate carrier voltage, an intermediate frequency carrier oscillator of the twin triode type for use with all of the channels, a diode gate to control the volume of a portion of the carrier, a volume control resistor connected in common in the circuits of all of the aforesaid volume control diodes, means including a time constant RC circuit connecting said volume control resistor to the diode gate, a reversing switch, means connecting a volume-controlled portion of the carrier to one part of said reversing switch, means connecting a non-volume-controlled portion of the carrier to another part of said switch, means connecting the modulators of all of the channels in common to a part of said switch, and means connecting the detectors of all of the channels in common to another part of said switch, the switch arrangement being such that in one switch position the volume-controlled carrier is supplied to the modulators and the non-volume-controlled carrier is supplied to the detectors, and in another switch position the volume-controlled carrier is supplied to the detectors and the non-volume-controlled carrier is supplied to the modulators.

12. A binaural amplitude modulation carrier suppressed circuit for a transmitter comprising a source of carrier energy, means in each of the channels to modulate the same, volume limiting means associated with the source of carrier energy for controlling the volume of the carrier energy which is to be used for both channels, a common control circuit for controlling the said volume limiting means, and means connecting the two channels to said common control circuit, whereby the volume of both channels is controlled by the channel of greater volume, and whereby said volume limiting means controls the amplitude of the carrier prior to applying the program modulation to said carrier.

13. A binaural transmission circuit comprising two channels each having a carrier eliminated modulator, and a diode for volume control, a carrier oscillator for use with both channels, means to control the carrier volume, said means including a volume control impedance connected in common in the circuits of both volume control diodes, and means for supplying the volume-controlled carrier in common to the carrier eliminated modulators of both channels.

14. A binaural transmission circuit comprising two channels each having a carrier eliminated modulator, a rectifier for volume control, and a detector for exalted carrier detection, a carrier oscillator for use with both channels, means to control the volume of a portion of the carrier including a volume control impedance connected in common in the circuits of both of the aforesaid volume control rectifiers, means for feeding the volume-controlled portion of the carrier in common to the carrier eliminated modulators of both of the channels, and means for feeding a non-volume-controlled portion of the carrier to the exalted carrier detectors of both of the channels.

15. A binaural transmission circuit comprising two channels each having a triple triode carrier eliminated modulator, a diode for volume control, a triple triode detector for exalted carrier detection, and a filter to eliminate carrier voltage, an intermediate frequency carrier oscillator of the twin triode type for use with both channels, a diode gate to control the volume of a portion of the carrier, a volume control resistor connected in common in the circuits of both of the aforesaid volume control diodes, means including a time constant RC circuit connecting said volume control resistor to the diode gate, means for feeding the volume-controlled portion of the carrier following the diode gate in common to the carrier eliminated modulators of both of the channels, and means for feeding a non-volume-controlled portion of the carrier to the exalted carrier detectors of both of the channels.

16. A binaural transmission circuit comprising two channels each having a carrier eliminated modulator, a diode for volume control, and a detector for exalted carrier detection, a carrier oscillator for use with both channels, means to control the volume of a portion of the carrier including a volume control impedance connected in common in the circuits of both volume control diodes, a reversing switch, means connecting a volume-controlled portion of the carrier to one part of said reversing switch, means connecting a non-volume-controlled portion of the carrier to another part of said switch, means connecting both modulators in common to a part of said switch, and means connecting both detectors in common to another part of the switch, the switch arrangement being such that in one switch position the volume-controlled carrier is supplied to the modulators and the non-volume-controlled carrier is supplied to the detectors, and in another switch position the volume-controlled carrier is supplied to the detectors and the non-volume-controlled carrier is supplied to the modulators.

17. Apparatus for volume limiting the multiple channels of a multinaural system while preserving relative differences of volume between the channels, said apparatus comprising means to supply a carrier for all of the channels, modulation means for each of said channels to modulate said carrier by each of said channels to produce sidebands with the carrier eliminated for each of said channels, a volume-control circuit responsive to the sidebands in common whereby the maximum volume channel takes over the control, and means to apply the resulting volume control to the means which supplies the unmodulated carrier.

18. Apparatus for volume limiting the multiple channels of a multinaural system while preserving relative differences of volume between the channels, said apparatus comprising means to supply a carrier for all of the channels, modulation means for each of said channels to modulate said carrier by each of said channels to produce sidebands with the carrier eliminated for each of said channels, a volume-control circuit responsive to the sidebands in common whereby the maximum volume channel takes over the control, means to apply the resulting volume control to the means which supplies the unmodulated carrier, and means to separately detect the volume-controlled sidebands in order to restore the original signals as volume-controlled.

19. Apparatus for volume limiting an audio frequency wave, which includes means to generate a carrier, means to modulate said carrier by said wave, means to rectify a resulting radio frequency wave to obtain a volume control potential, a volume control means responsive to said rectified radio frequency wave to volume control the amplitude of the unmodulated carrier before it is supplied to the modulator means, and means to detect the modulated and volume controlled carrier in order to restore the audio frequency wave as volume-controlled.

20. Apparatus for volume limiting an audio frequency wave, which includes means to generate a carrier, means to modulate said carrier by means of said wave in such manner as to produce sidebands with the carrier eliminated, means to rectify the radio frequency sidebands to obtain a volume control potential, a volume control means responsive to said volume control potential to volume control the unmodulated carrier before it is supplied to the modulator means, and means to detect the volume-controlled sidebands in order to reproduce the audio frequency wave as volume-controlled.

References Cited in the file of this patent

UNITED STATES PATENTS

| | | |
|---|---|---|
| 1,550,660 | Affel | Aug. 25, 1925 |
| 2,111,765 | Franks | Mar. 22, 1938 |
| 2,151,921 | Kramer et al. | Mar. 28, 1939 |
| 2,195,290 | Shofstall | Mar. 26, 1940 |
| 2,258,662 | Snow | Oct. 14, 1941 |
| 2,343,471 | Nixon | Mar. 7, 1944 |
| 2,379,484 | Haynes | July 3, 1945 |
| 2,455,332 | Hare | Nov. 30, 1948 |
| 2,723,387 | Salvin | Nov. 8, 1955 |
| 2,798,947 | Dodington | July 9, 1957 |